(12) United States Patent
Watanabe (10) Patent No.: US 8,443,061 B2
(45) Date of Patent: May 14, 2013

(54) DATA TRANSMISSION METHOD AND COMMUNICATION CONTROL APPARATUS

(75) Inventor: Shunichiro Watanabe, Fuchu (JP)

(73) Assignee: Canon Kabushiki Kaisha, Tokyo (JP)

( * ) Notice: Subject to any disclaimer, the term of this patent is extended or adjusted under 35 U.S.C. 154(b) by 1066 days.

(21) Appl. No.: 12/403,708

(22) Filed: Mar. 13, 2009

(65) Prior Publication Data

US 2009/0231622 A1 Sep. 17, 2009

(30) Foreign Application Priority Data

Mar. 14, 2008 (JP) .................. 2008-066511

(51) Int. Cl.
*G06F 15/16* (2006.01)
(52) U.S. Cl.
USPC .......................................... 709/221; 714/18
(58) Field of Classification Search .................. 709/232, 709/206, 203, 221; 714/15, 19, 4.1, 18
See application file for complete search history.

(56) References Cited

U.S. PATENT DOCUMENTS

| | | | |
|---|---|---|---|
| 6,327,584 B1 * | 12/2001 | Xian et al. | 707/999.001 |
| 7,228,455 B2 * | 6/2007 | Pavlik et al. | 714/15 |
| 7,246,214 B2 * | 7/2007 | Nakano et al. | 711/163 |
| 7,478,101 B1 * | 1/2009 | Manley | 707/999.1 |
| 2009/0231622 A1 * | 9/2009 | Watanabe | 358/1.15 |

FOREIGN PATENT DOCUMENTS

| | | |
|---|---|---|
| JP | 5-081111 A | 4/1993 |
| JP | 8-212119 A | 8/1996 |
| JP | 2002-007197 A | 1/2002 |
| JP | 2008-040823 A | 2/2008 |

* cited by examiner

*Primary Examiner* — Kevin Bates
(74) *Attorney, Agent, or Firm* — Canon USA Inc. IP Division (57) ABSTRACT

A data transmission apparatus transmits first and second data to transmission destinations, respectively. Upon completion of transmission of the second data, the data transmission apparatus instructs the transmission destination of the first data to confirm transmission processing of the first data that is transmitted before the second data is transmitted.

9 Claims, 10 Drawing Sheets

| | FILE A | FILE B | FILE C |
|---|---|---|---|
| 301 — FILE | | | |
| 302 — FILE TRANSMISSION DESTINATION | ftp://A/data | http://A/webdav | http://A/webservice |
| 303 — TRANSMISSION METHOD | FTP | WebDAV | WEB SERVICE |
| 304 — TRANSMISSION COMMITMENT METHOD | CHANGE NAME TO A.dat | CHANGE NAME TO B.dat2 | CALL WEB SERVICE http://A/commit |
| 305 — ROLLBACK METHOD | DELETION | DELETION | CALL WEB SERVICE http://A/rollback |

| FILE | FILE A | FILE B | FILE C |
|---|---|---|---|
| FILE TRANSMISSION DESTINATION | ftp://A/data | http://B/webdav | http://B/webservice |
| TRANSMISSION METHOD | FTP | WebDAV | WEB SERVICE |
| TRANSMISSION COMMITMENT METHOD | CHANGE NAME TO A.dat | CHANGE NAME TO B.dat2 | CALL WEB SERVICE Ahttp://B/commit |
| ROLLBACK METHOD | DELETION | DELETION | CALL WEB SERVICE http://B/rollback |

FIG. 9B

DATA TRANSMISSION METHOD AND COMMUNICATION CONTROL APPARATUS

BACKGROUND OF THE INVENTION

1. Field of the Invention

The present invention relates to a data transmission method and a communication control apparatus.

2. Description of the Related Art

There has been a system for uploading a file to a file server. For example, Japanese Patent Application Laid-Open No. 05-081111 discusses a system that manages a state of a transaction when an update of a file is performed, and that performs data restoration when an error occurs.

Japanese Patent Application Laid-Open No. 08-212119 discusses an operation (hereinafter referred to as a commitment (commit)) of collectively determining a sequence of steps of an update process to exclusively control access from a plurality of clients in order to prevent occurrence of conflict. In addition, Japanese Patent Application Laid-Open No. 08-212119 discusses an operation of returning, in a case where an error occurs while a sequence of steps of an update process is performed, a state of a file server to a state thereof before the process is started (hereinafter referred to as a rollback).

In a case where a plurality of files are uploaded to a file server in one operation, sometimes, the plurality of files to be uploaded have a relationship with one another. For example, there is a case that when files A and B exist, a process cannot be done on the file B when the file A does not exist.

SUMMARY OF THE INVENTION

The present invention is directed to maintaining consistency among a plurality of pieces of data in a process of transmitting the plurality of pieces of data.

According to an aspect of the present invention, a data transmission method includes transmitting first and second data, and instructing, in response to normal completion of transmission of the second data, a transmission destination of the first data to confirm transmission processing of the first data that is transmitted before the second data.

According to another aspect of the present invention, a communication control apparatus includes a monitoring unit configured to monitor a state of a data transmission apparatus, a commitment unit configured to instruct, in response to a request from the data transmission apparatus, a transmission destination of first data and a transmission destination of second data to confirm transmission processing of the first and second data transmitted by the data transmission apparatus before the request, and a rollback unit configured to instruct, in response to occurrence of an error while the second data is transmitted, the transmission destination of the first data to perform rollback of a state of the transmission destination of the first data before receiving the first data.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will be described in detail below with reference to the drawings.

Figure 1:
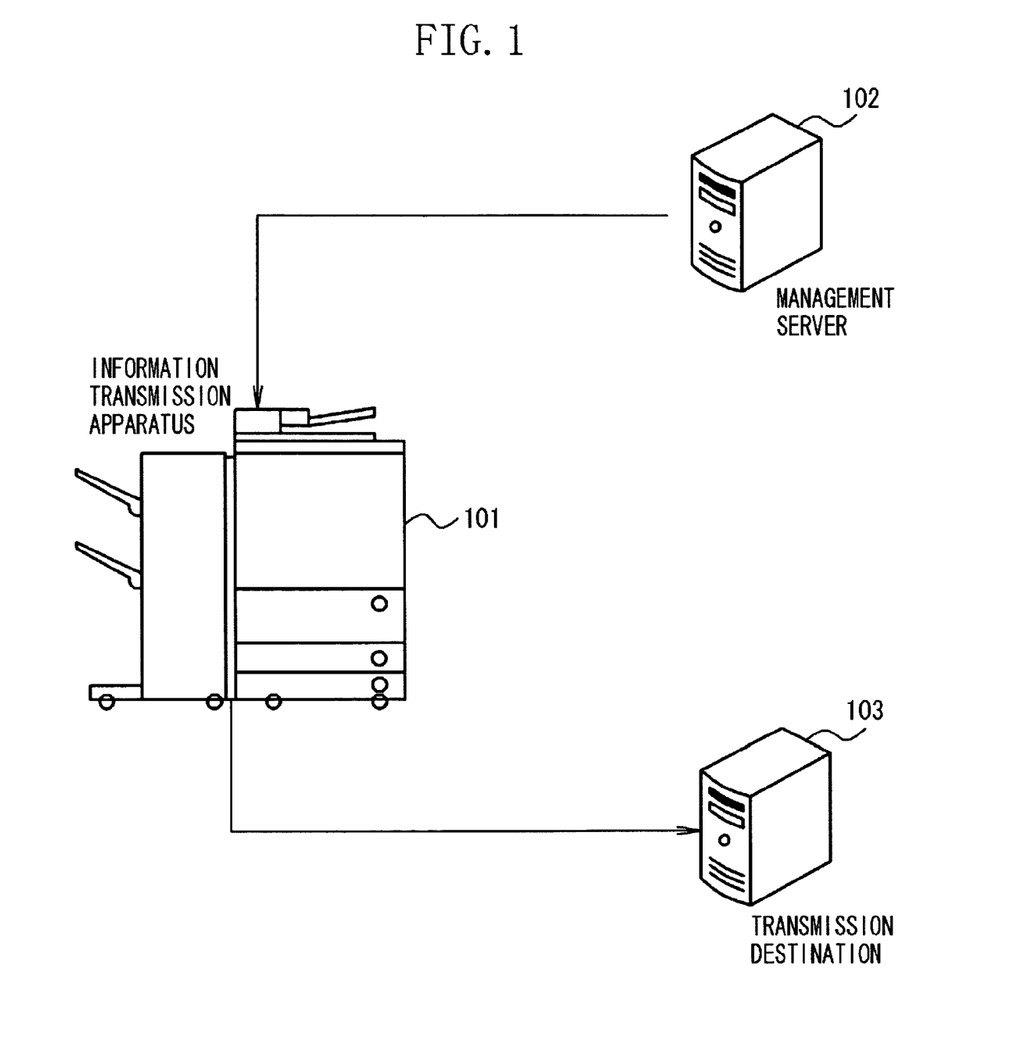
FIG. 1 illustrates a configuration of an information processing system according to a first exemplary embodiment of the present invention.

FIG. 1 illustrates a configuration of an information processing system according to a first exemplary embodiment of the present invention.

As illustrated in FIG. 1, an information transmission apparatus 101 communicates inform action with a management server 102 and a transmission destination 103 via communication lines.

The management server 102 stores and manages information files for each user. Each information file includes a transmission destination thereof, a method for performing transmission processing thereof, a method for confirming (hereinafter sometimes referred to as a commitment) the transmission processing of the transmitted file, and a method for restoring (hereinafter sometimes referred to as a rollback) a state of a transmission destination 103, the transmission processing to which is not committed, to a state before transmission of the file is performed.

The transmission destination 103 of data, which is a file server, stores transmitted data.

Figure 2:
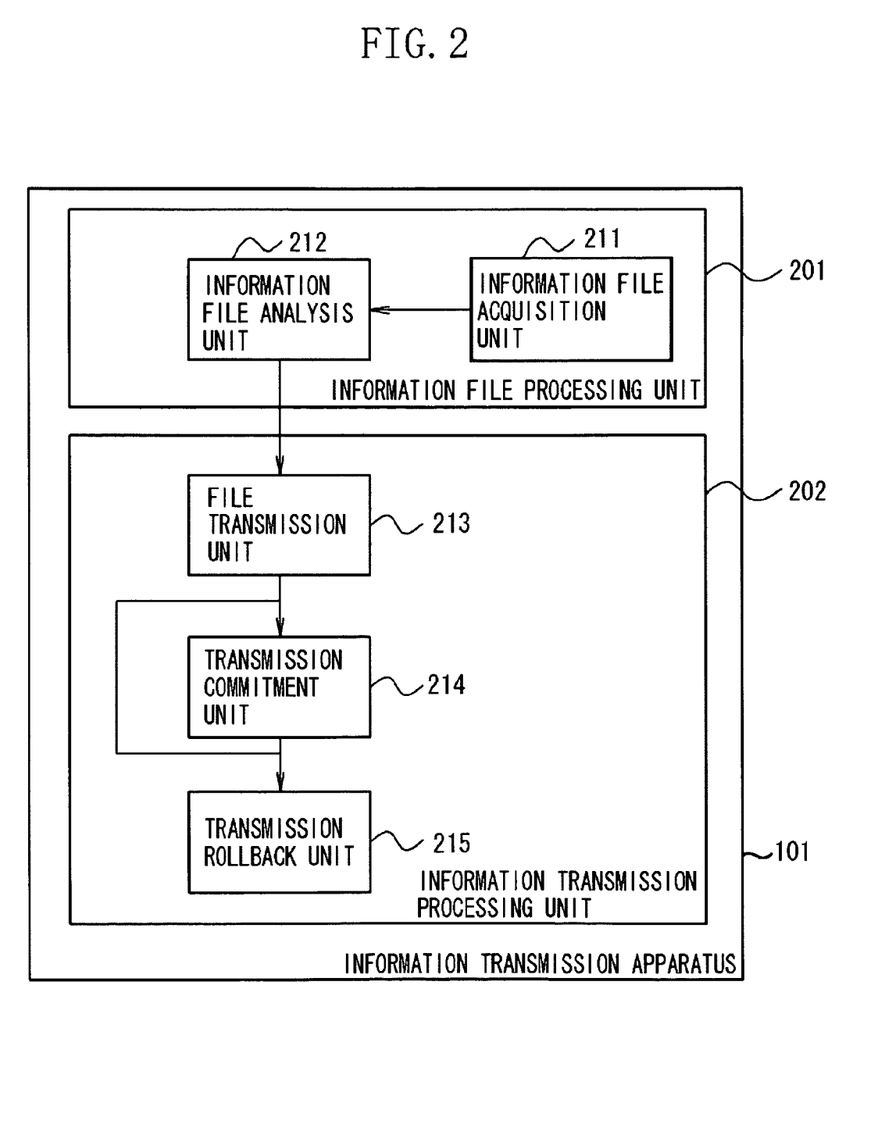
FIG. 2 illustrates an internal configuration of an information transmission apparatus according to the first exemplary embodiment of the present invention.

FIG. 2 illustrates an internal configuration of the information transmission apparatus 101. As illustrated in FIG. 2, the information transmission apparatus 101 includes an information file processing unit 201 and an information transmission processing unit 202.

The information file processing unit 201 receives an information file from the management server 102 and analyzes the contents of the received information file.

The information transmission processing unit 202 receives the analyzed information from the information file processing unit 201. Then, the information transmission processing unit 202 transmits a file to the transmission destination 103, performs a commitment for the transmission processing, and performs a rollback processing for the transmission destination 103, based on the received information.

The information file processing unit 201 includes an information file acquisition unit 211 and an information file analysis unit 212. The information file acquisition unit 211 acquires an information file from the management server 102. The information file analysis unit 212 analyzes contents of the information file acquired by the information file acquisition unit 211 and transmits the analyzed result to the information transmission processing unit 202.

The information transmission processing unit 202 includes a file transmission unit 213, a transmission commitment unit 214, and a transmission rollback unit 215.

The file transmission unit 213 transmits a file to the transmission destination 103, based on an analyzed result of an information file by the information file analysis unit 212. The transmission commitment unit 214 confirms the file transmission processing to the transmission destination 103 according to an analyzed result by the information file analysis unit 212, when the file transmission processing performed by the file transmission unit 213 is normally completed.

The transmission rollback unit 215 restores a state of the transmission destination 103 to a state before the file is transmitted by the file transmission unit 213, based on an analyzed result of an information file by the information file analysis unit 212, when the file transmission processing performed by the file transmission unit 213 is abnormally terminated.

The above-described functional configuration including the units 211, 212, 213, 214, and 215 is implemented by temporarily storing in a random access memory (RAM) a program, which is stored in a hard disk drive (HDD), and by executing the program by a central processing unit (CPU). The HDD, the RAM, and the CPU can be mounted in the information transmission apparatus 101. Alternatively, the HDD, in which the program is preliminarily stored, can be provided outside the information transmission apparatus 101. Further, the program can be supplied to the information transmission apparatus 101 via a communication line (e.g., the Internet).

The information file acquisition unit 211, the file transmission unit 213, the transmission commitment unit 214, and the transmission rollback unit 215 are connected to a network via a network interface (not illustrated). The management server 102 and the transmission destination 103 are connected to the network.

Figure 3:
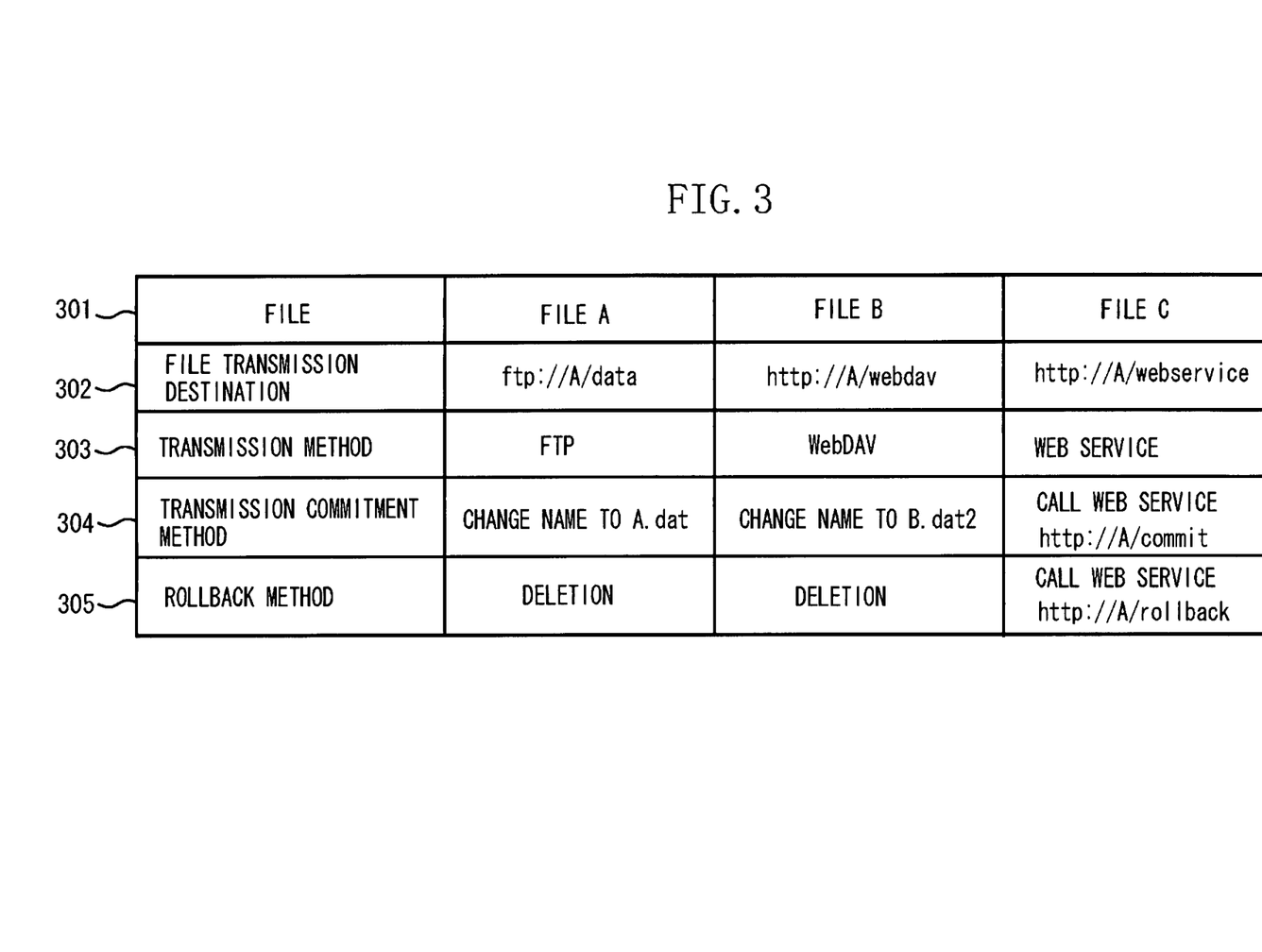
FIG. 3 is a table illustrating a configuration of an information file according to the first exemplary embodiment of the present invention.

FIG. 3 is a table illustrating a conceptual configuration of an information file according to the first exemplary embodiment of the present invention. An information file is described in a language that can be interpreted by a CPU. This information file is acquired by the information file acquisition unit 211 from the management server 102.

Referring to FIG. 3, a record 301 includes, in each item field, information (e.g., a file name) indicating a target file.

A record 302 includes, in each item field, information (e.g., a uniform resource locator (URL)) specifying a transmission destination for each target file. A record 303 includes, in each item field, information (e.g., a protocol) specifying a transmission method for transmitting a target file to a transmission destination.

A record 304 stores, in each item field, information specifying a transmission commitment method for confirming transmission processing for each target file. A record 305 includes, in each item field, information specifying a rollback method for returning a state of a transmission destination to a state before the transmission thereof is performed for each target file.

Figure 4:
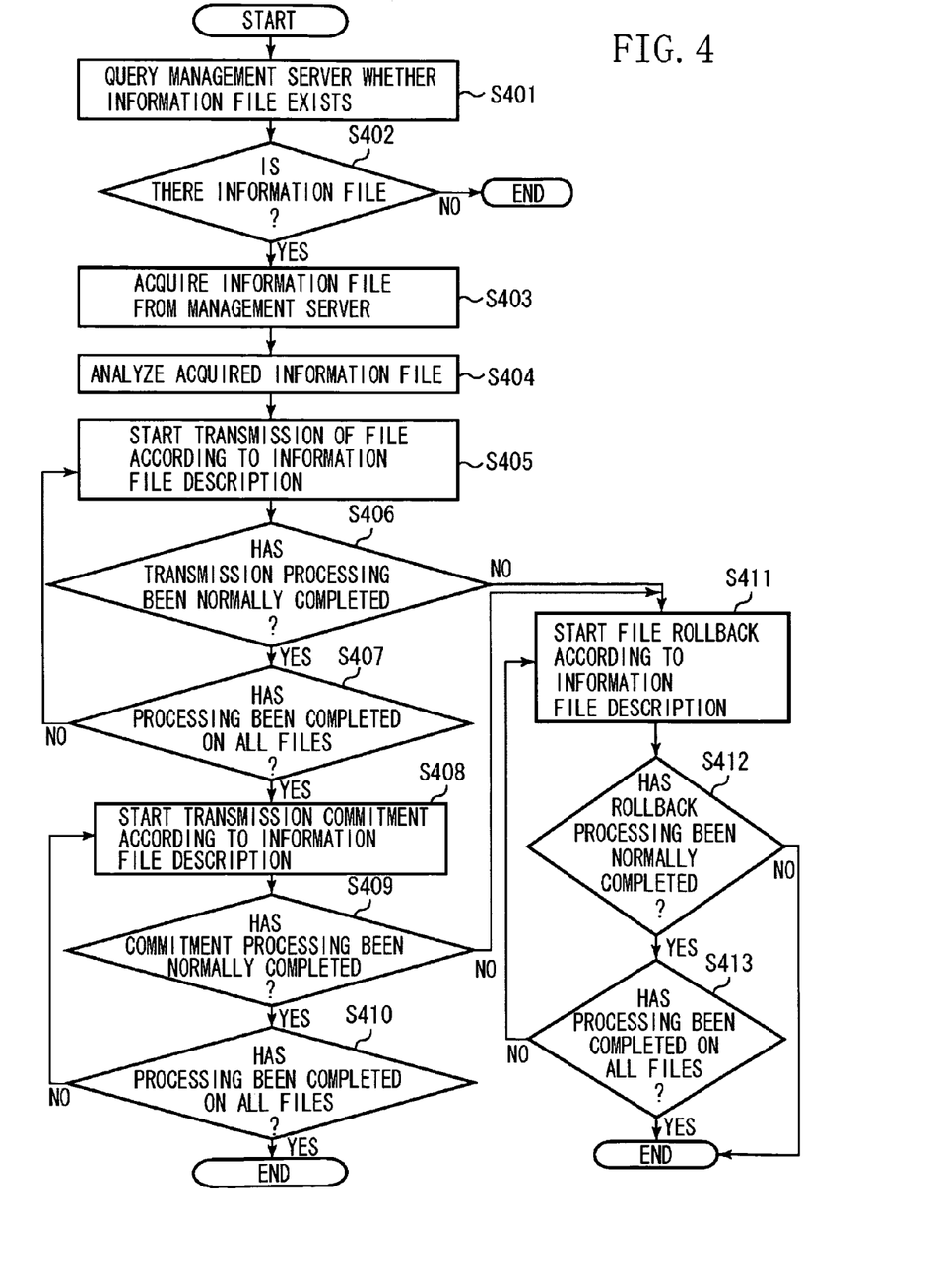
FIG. 4 is a flow chart illustrating an operation of the information processing system according to the first exemplary embodiment of the present invention.

Next, an operation of the information processing system according to the first exemplary embodiment of the present invention is described below with reference to FIG. 4.

In step S401, the information file acquisition unit 211 queries whether an information file exists in the management server 102.

In step S402, the information file acquisition unit 211 determines whether an information file exists in the management server 102. If an information file exists (YES in step S402), the processing proceeds to step S403. In step S403, the information file acquisition unit 211 acquires the information file from the management server 102. If no information file exists (NO in step S402), the operation ends.

Next, in step S404, the information file analysis unit 212 analyzes the information file acquired by the information file acquisition unit 211.

According to an example of the information file illustrated in FIG. 3, the following contents of the information file are analyzed. That is, the transmission destination of a file A is "ftp://A/data". The protocol used as a method for transmission of the file A is "file transfer protocol" (FTP) The transmission commitment method for determining transmission processing of the file A is to "change a name thereof to A.dat". The rollback method for rollback of the transmission destination 103 of the file A is a "deletion" (of the file A). In step S404, contents of each of a file B and a file C are analyzed in a similar manner.

Next, in step S405, the file transmission unit 213 starts transmitting a file to the transmission destination 103, based on a result of analysis performed by the information file analysis unit 212.

According to the example of the information file illustrated in FIG. 3, the following transmission processing is performed. If all of the files A through C are target files to be transmitted, the file A is transmitted to the address "ftp://A/data" in the transmission destination 103. The file B is transmitted to the address "http://A/webdav" in the transmission destination 103. The file C is transmitted to the address "http://A/webservice" in the transmission destination 103. Processing performed in a loop including steps S404, S406 (described below), and S407 (described below) is repeated. Thus, these transmission operations are performed.

The files A through C are serially input to the information transmission apparatus 101. If the information transmission apparatus 101 includes a reader for reading an original, originals (files A through C) are serially read. Thus, the files A through C are created.

Subsequently, in step S406, the file transmission unit 213 determines whether the transmission of the file is normally completed. If the transmission of the file is normally completed (YES in step S406), the processing proceeds to step S407. In step S407, the file transmission unit 213 determines whether transmission processing for all of the target files is completed. If an error occurs while the file is being transmitted (NO in step S406), the processing proceeds to step S411. From step S411, rollback for the transmission destination 103 is performed.

If the transmission of all target files is not completed (NO in step S407), the file transmission unit 213 returns the processing to step S405. Then, in step S405, the file transmission unit 213 starts transmitting the next target file.

If the transmission of all of the target files is completed (YES in step S407), the processing proceeds to step S408. In step S408, the transmission commitment unit 214 starts commitment for confirming the transmission processing of all files, based on the result of analysis performed in step S404 by the information file analysis unit 212.

In the example of the information file illustrated in FIG. 3, upon completion of transmission of all the files A through C (YES in step S410), a process of changing the name of the file A to "A.dat" is performed in the transmission destination 103 as the commitment (determination) of the transmission of the file A. Regarding the file B, a process of changing the name of the file B to "B.dat" is performed in the transmission destination 103 as the commitment of the transmission of the file B. Regarding the file C, a process of calling a "web service" ("http://A/commit") is performed in the transmission destination 103 as the commitment of the transmission of the file C. These processes are performed by repeating the processing of steps S408, S409 (described below), and S410 (described below).

Then, in step S409, the transmission commitment unit 214 determines whether commitment of transmission processing of a target file to be transmitted is normally completed. If an error occurs in the commitment of transmission processing of the target file (NO in step S409), the processing proceeds to step S411. From step S411, rollback processing for the transmission destination 103 is performed. If the commitment of the transmission processing of the file is normally completed (YES in step S409), the processing proceeds to step S410. In step S410, the transmission commitment unit 214 determines whether the commitment of the transmission processing is completed on all target files to be transmitted.

If the commitment of the transmission processing is not completed on all of the target files (NO in step S410), the transmission commitment unit 214 returns the processing to step S408. Then, in step S408, the transmission commitment unit 214 starts the commitment of transmission processing of the next target file. If the commitment of the transmission processing is completed on all of the target files (YES in step S410), then the processing finishes.

If it is determined that an error occurs while the transmission of the file is performed (NO in step S406), the processing proceeds to step S411. Then, in step S411, the transmission rollback unit 215 starts returning (i.e., rollback) the state of the transmission destination 103 to the state before the file is transmitted according to the result of the analysis performed by the information file analysis unit 212 in step S404.

That is, if an error occurs in the transmission processing of any one of the files before the transmission processing of a file is normally completed on all of the target files, in step S406, it is determined that an error occurs while the transmission processing of the file is performed (NO in step S406). Then, the processing proceeds to step S411. In step S411, rollback processing starts to be performed on the transmitted file.

If it is determined that an error occurs in the commitment of the transmission processing of the file (NO in step S409), the transmission rollback unit 215 starts, based on the result of the analysis performed by the information file analysis unit 212 in step S404, rollbacking the state of the transmission destination 103 to the state in which none of the files are transmitted yet. That is, if an error occurs in the commitment of the transmission processing of any one of the files before the commitment of the transmission processing is completed on all of the target files, in step S409, it is determined that an error occurs in the commitment of the transmission processing of the file. Then, in step S411, rollback is started. In the present embodiment, in step S411, the transmission rollback unit 215 starts, based on the result of the analysis performed in step S404 by the information file analysis unit 212, rollbacking the state of the transmission destination 103 to the state in which none of the files are transmitted yet.

For example, according to the information file illustrated in FIG. 3, in a case where the transmission processing of the file A has already been normally completed, and an error occurs while the subsequent transmission of the file C is performed, the file A is deleted from the transmission destination 103. Further, a web service for rollback of the state of the transmission destination 103 is called. Then, the state of the transmission destination 103 corresponding to the file C is rollbacked. Consequently, the state of the transmission destination 103 is returned to the state before the transmission of the files A and C is performed.

These processes are performed by repeating the processing of the step S411, and steps S412 and S413 that are described below. That is, after the file A is deleted from the transmission destination 103 in step S411, then in step S413, it is determined whether there is a file left to be rollbacked. Because the file C is left, the processing returns to step S411. Then, in step S411, the state of the transmission destination 103 is rollbacked to the state before the file C is received. Subsequently, because there is no file to be rollbacked, the processing finishes.

In a case where the commitment of the transmission processing of the file A has already been completed and an error occurs while the commitment of the subsequent transmission processing of the file B is performed, the transmission of all of the files A through C have already been completed in this stage. Thus, the files A and B are deleted from the transmission destination 103. In addition, the web service for rollbacking the transmission destination 103 is called. Then, the state of the file C of the transmission destination 103 is rollbacked. Consequently, the state of the transmission destination 103 is returned to the state before the files A, B, and C are transmitted. These processes are performed by repeating the processing of step S411, and steps S412 and S413 that are described below.

In this case, the files A through C have been transmitted. Thus, the rollback processing on each of the files A through C of the transmission destination 103 is performed.

Subsequently, in step S412, the transmission rollback unit 215 determines whether the state of the transmission destination 103 is rollbacked to the state before the transmission of the files are performed. If an error occurs in the rollback processing, the processing finishes. If rollback processing is normally completed (YES in step S412), then processing proceeds to step S413. In step S413, the transmission rollback unit 215 determines whether the rollback processing on the state of the transmission destination 103 to the state before the file is transmitted is normally completed on all of the target files.

If the rollback processing on the state of the transmission destination 103 is not completed on all of the target files (NO in step S413), the processing returns to step S411. Then, in step S411, the transmission rollback unit 215 starts rollbacking the state of the transmission destination 103 with respect to the next target file. If the rollback processing on the state of the transmission destination 103 has been completed on all of the target files (YES in step S413), the processing finishes. If there is a file on which the rollback processing of the state of the transmission destination is unnecessary, performance of the rollback is not needed.

Thus, according to the present embodiment, in a case where an error occurs while any one of a plurality of files is transmitted, the state of the transmission destination is rollbacked to the state before the transmission of all of the files which have already been transmitted before the file that is erroneously transmitted. Consequently, according to the present embodiment, the state of the transmission destination can be rollbacked to a state in which consistency among files, which have been transmitted, is established.

The commitment of the transmission of a plurality of files to a transmission destination can be performed all together, based on a result of analysis of an information file. Accordingly, even in a case where files differ from one another in communication protocol and in file management method, the commitment of the transmission processing can be achieved while consistency among the plurality of files is maintained.

In addition, because the transmission and the reception of files are performed only between the information transmission apparatus and the transmission destination, a transaction can be managed at the side of the information transmission apparatus. Consequently, extra traffic for managing transactions is not necessary.

Figure 5:
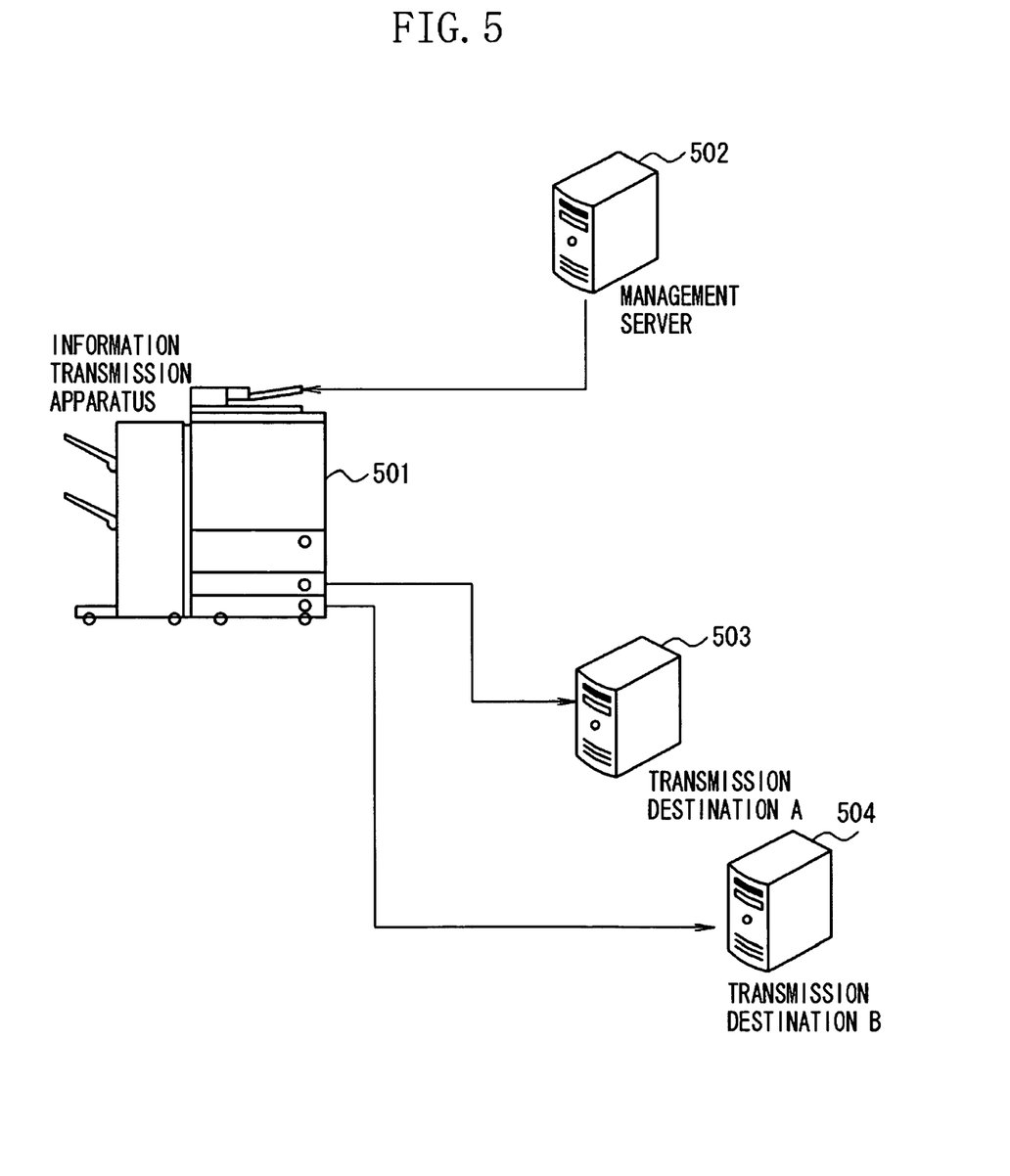
FIG. 5 illustrates a configuration of an information processing system according to a second exemplary embodiment of the present invention.

Next, a second exemplary embodiment of the present invention is described below. FIG. 5 illustrates a configuration of an information processing system according to the second embodiment.

As illustrated in FIG. 5, an information transmission apparatus 501 exchanges information between a management server 502, a transmission destination A 503 and a transmission destination B 504, which are described below, via communication lines.

The management server 502 stores and manages information files for each user. It is similar to the first embodiment that each information file includes a transmission destination thereof, a method for performing transmission processing thereof, a method for committing the transmission processing of the transmitted file, and a method for rollbacking a state of transmission destinations A 503 and B 504 to each of which no methods are determined for rollbacking a state thereof to a state before the transmission.

The data transmission destination A 503 and the data transmission destination B 504 are file servers that store data transmitted thereto.

An internal configuration of the information transmission apparatus 501 is similar to that of the information transmission apparatus 101 according to the first embodiment illustrated in FIG. 2. Thus, description of the internal configuration of the information transmission apparatus 501 is not repeated.

Figure 6:
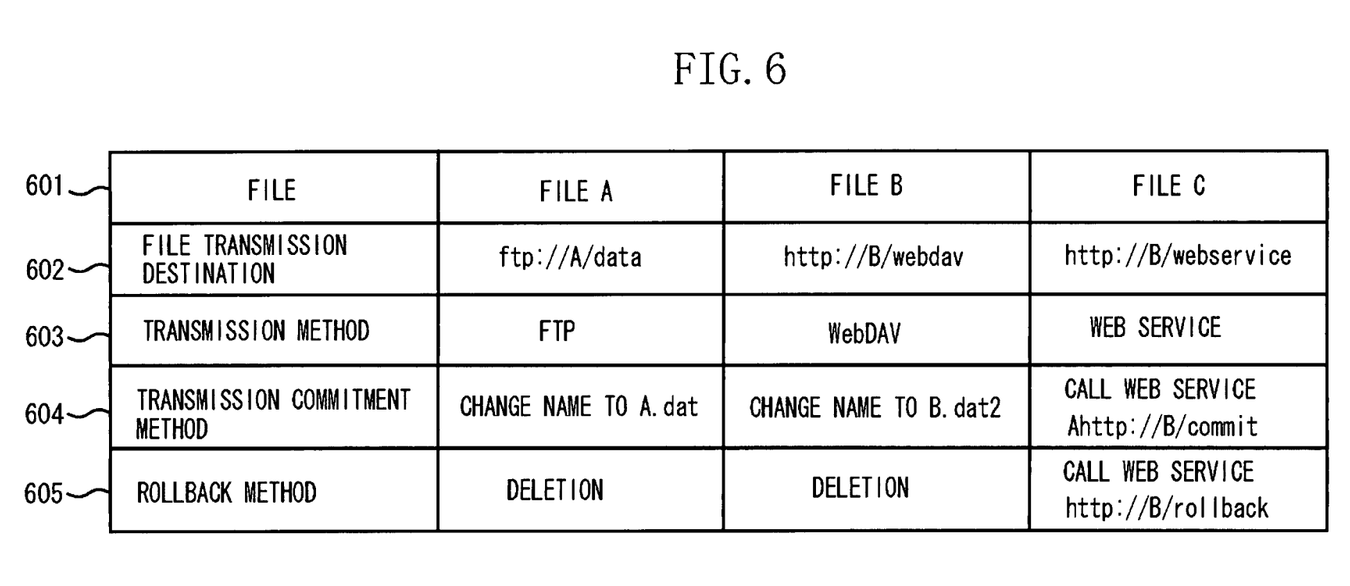
FIG. 6 is a table illustrating an internal configuration of an information file according to the second exemplary embodiment of the present invention.

FIG. 6 is a table illustrating an internal configuration of an information file according to the second embodiment of the present invention. That is, FIG. 6 illustrates the configuration of an information file on a conceptual basis. An information file is described in a language that can be interpreted by a CPU.

Referring to FIG. 6, a record 601 includes, in each item field, information representing a target file.

A record 602 includes, in each item field, information specifying a transmission destination of a target file. A record 603 includes, in each item field, information specifying a transmission method for transmitting a target file to a transmission destination.

A record 604 includes, in each item field, information specifying a transmission commitment method for determining transmission processing for a target file. A record 605 includes, in each item field, information specifying a rollback method for returning a state of a transmission destination 103 of a target file to a state before the transmission thereof is performed.

Hereinafter, differences in operation between the present embodiment the first embodiment are described with reference to FIG. 4. In the present embodiment, a file A is transmitted to the address "ftp://A/data" in the transmission destination A 503 by repeating processing of steps S405 through S407 in FIG. 4. A file B is transmitted to the address "ftp://B/webdav" in the transmission destination B 504. A file C is transmitted to the address "ftp://B/webservice" in the transmission destination B 504.

In a case where all of the files A through C are transmitted to the transmission destinations A and B, commitment of transmission processing for each of the files A through C is performed by repeating processing of steps S408 through S410.

That is, regarding the file A, a process of changing the name of the file A to "A.dat" in the transmission destination A 503 is performed. Regarding the file B, a process of changing the name of the file B to "B.dat2" in the transmission destination B 504 is performed. Regarding the file C, a process of calling a "web service" ("http://B/commit") in the transmission destination B 504 is performed. Thus, the commitment of the transmission processing for each of the files A through C is performed.

In a case where an error occurs in the transmission processing of any one of the files A through C, the transmission commitment unit 214 repeats processing of steps S411 through S413 to thereby return a state of each of the transmission destination A 503 and the transmission destination B 504 with respect to the transmitted files to a state before the file is transmitted.

For example, according to the information file illustrated in FIG. 6, in a case where the transmission processing of the file A has already been normally completed, and an error occurs while the subsequent transmission of the file C is performed, the file A is deleted from the transmission destination A 503. Further, a web service for rollbacking the state of the transmission destination B 504 is called. Then, the state of the transmission destination B 504 with respect to the file C is rollbacked. Consequently, the state of each of the transmission destination A 503 and the transmission destination B 504 is returned to the state before the transmission of the files A and C is performed.

In a case where an error occurs in commitment of transmission processing of any one of the files A through C, the transmission rollback unit 215 repeats processing of steps S411 to S413. Consequently, the state of each of the transmission destination A 503 and the transmission destination B 504 with respect to the files A to C is returned to the state before the transmission of the files A to C is performed.

As described above, in the present embodiment, there are a plurality of transmission destinations. Therefore, the present embodiment differs from the first embodiment in the system configuration and the contents of information files. However, the present embodiment is similar to the first embodiment in the flow of processing. That is, the present embodiment performs a transmission, a commitment, and a rollback on all files according to the contents described in the information file. Thus, even in a case where there are a plurality of transmission destinations, the information processing system can deal with files without necessity for performing special processing and a special change of the system.

Figure 7:
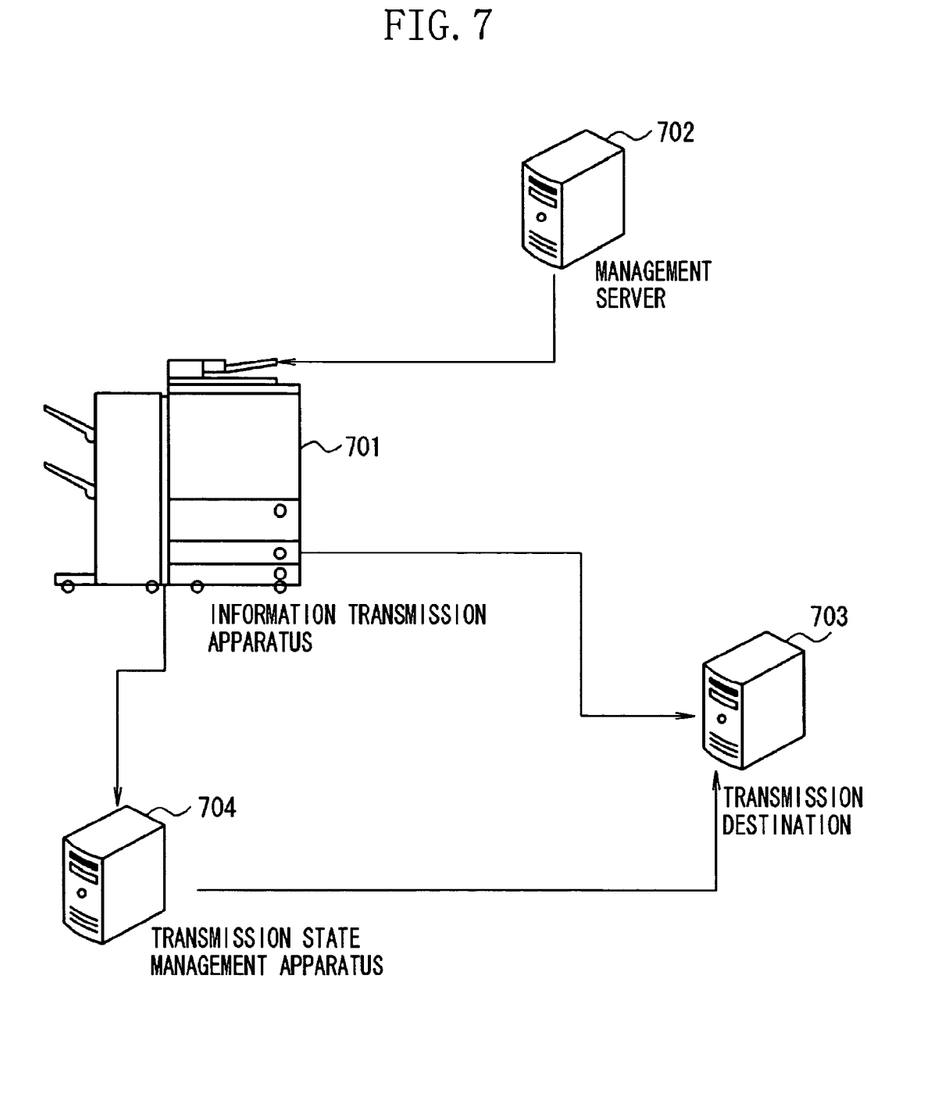
FIG. 7 illustrates a configuration of an information processing system according to a third exemplary embodiment of the present invention.

Next, a third exemplary embodiment of the present invention is described below. FIG. 7 illustrates a configuration of an information processing system according to the third embodiment of the present invention.

As illustrated in FIG. 7, an information transmission apparatus 701 exchanges information with a management server 702, a transmission state management apparatus 704, and a transmission destination 703 via communication lines.

The management server 702 stores and manages information files for each user. Each information file includes a transmission destination thereof, a method for performing transmission processing thereof, a method for committing the transmission processing of the transmitted file, and a method for rollbacking a state of a transmission destination 703, to which no transmission processing is determined, to a state before the transmission of the file is performed.

The data transmission destination 703 is a file server to store the transmitted data. The transmission state management apparatus 704 receives an information file from the information transmission apparatus 701 and requests the transmission destination 703 to perform confirmation (i.e., commitment) of transmission processing and restoration (i.e., rollback) of a state of the transmission destination 703.

The information file used in the present embodiment is similar to that used in the first embodiment illustrated in FIG. 3.

Figure 8:
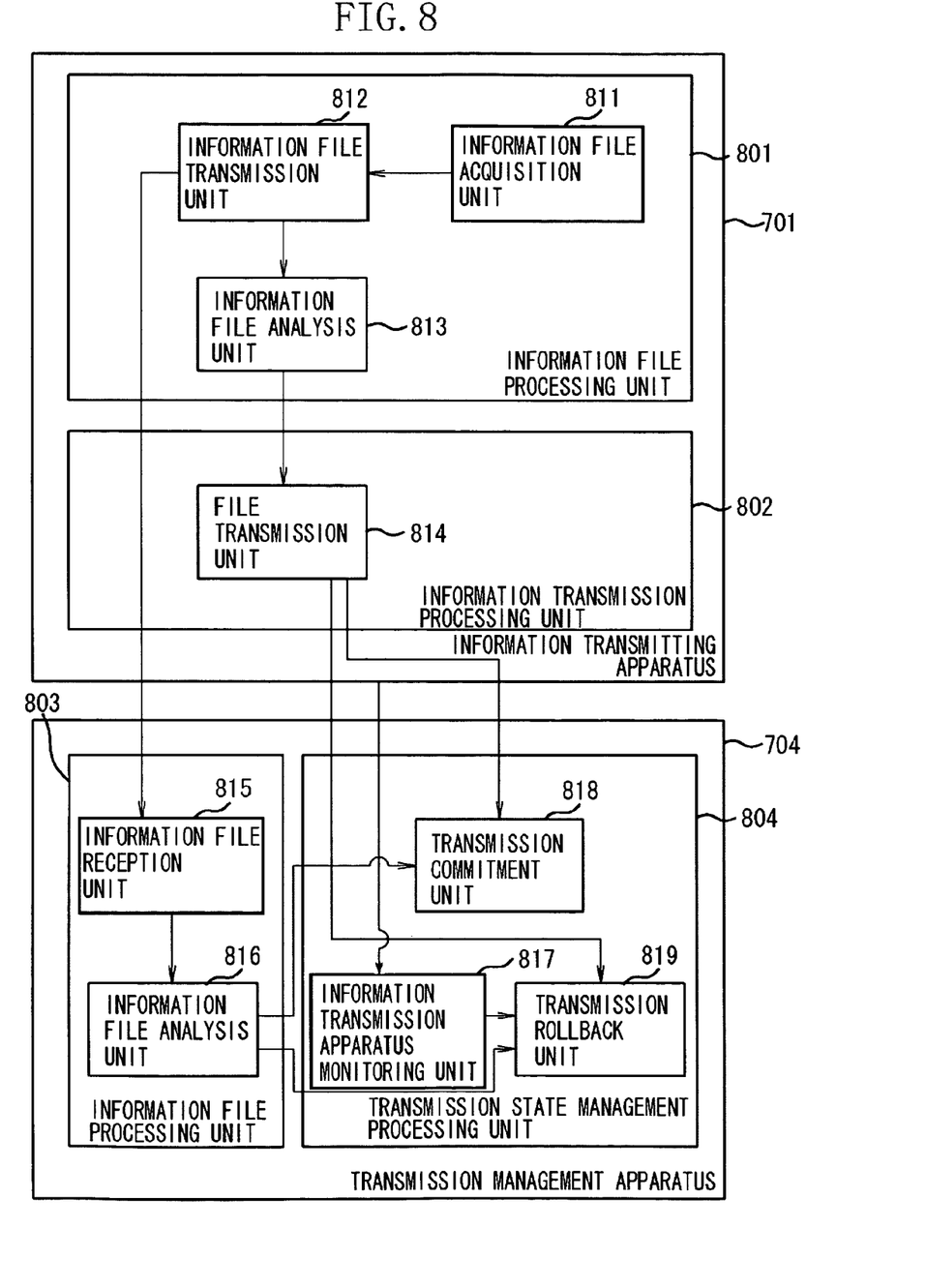
FIG. 8 illustrates an internal configuration of each of an information transmission apparatus and a transmission state management apparatus according to the third exemplary embodiment of the present invention.

FIG. 8 illustrates an internal configuration of each of an information transmission apparatus 701 and a transmission state management apparatus 704 according to the present embodiment. As illustrated in FIG. 8, the information transmission unit 701 includes an information file processing unit 801 and an information transmission processing unit 802. The transmission state management apparatus 704 includes an information file processing unit 803 and a transmission state management processing unit 804.

The information file processing unit 801 receives an information file from the management server 702. Then, the information file processing unit 801 transmits the received information file to the transmission state management apparatus 704 and analyzes the contents of the information file.

The information transmission processing unit 802 receives information representing a result of analysis performed on the information file from the information file processing unit 801. Then, the information transmission processing unit 802 performs transmission of the file to the transmission destination 703 based on the received information. After the transmission of the file is performed, the information transmission processing unit 802 requests the transmission state management apparatus 704 to perform commitment of file transmission processing and rollback of the state of the transmission destination 703.

The information file processing unit 803 receives an information file from the information transmission unit 803 and analyzes contents of the received information file.

The transmission state management processing unit 804 receives information representing a result of analysis of the information file from the information file processing unit 803. Then, the transmission state management processing unit 804 performs commitment of the file transmission processing and the rollback of the state of the destination based on the received information.

The information file processing unit 801 includes an information file acquisition unit 811, an information file transmission unit 812, and an information file analysis unit 813.

The information file acquisition unit 811 acquires an information file from the management server 702. Then, the information file transmission unit 812 transmits the information file acquired by the information file acquisition unit 811 to the transmission state management apparatus 704.

The information file analysis unit 813 analyzes the contents of the information file acquired by the information file acquisition unit 811. Then, the information file analysis unit 813 transmits the information, which represents a result of analysis of the contents of the acquired information file, to the information transmission processing unit 802.

The information transmission processing unit 802 includes a file transmission unit 814. The file transmission unit 814 transmits a file to the transmission destination 703 based on the result of analysis of the information file by the information file processing unit 801 (more specifically, the information file analysis unit 813).

In a case where a required file transmission is normally finished, the file transmission unit 814 requests the transmission state management apparatus 704 to perform the commitment of the file transmission processing. In a case where the file transmission is erroneously finished, the file transmission unit 814 requests the transmission state management apparatus 704 to perform rollback of the state of the transmission destination 703.

The information file processing unit 803 includes an information file reception unit 815 and an information file analysis unit 816. The information file reception unit 815 receives an information file transmitted from the information transmission apparatus 701 (more specifically, the information file transmission unit 812). The information file analysis unit 816 analyzes the contents of the information file received by the information file reception unit 815. Then, the information file analysis unit 816 transmits the information, which represents a result of analysis, to the transmission state management processing unit 804.

The transmission state management processing unit 804 includes an information transmission apparatus monitoring unit 817, a transmission commitment unit 818 and a transmission rollback unit 819.

The information transmission apparatus monitoring unit 817 monitors a state of the information transmission apparatus 701. In a case where an error occurs, the information transmission apparatus monitoring unit 817 requests the transmission rollback unit 819 to perform the rollback processing on the state of the transmission destination 703. In a case where a request therefor is received from the information transmission apparatus 701 (more specifically, the file transmission unit 814), the transmission commitment unit 818 performs commitment of transmission of a file to the transmission destination 703 according to the information analyzed by the information file analysis unit 816 (more specifically, a transmission commitment method).

In a case where a request for the rollback is sent from the information transmission apparatus 701 (more specifically, the file transmission unit 814), the transmission rollback unit 819 returns the state of the transmission destination 703 to the state before the file is transmitted by the file transmission unit 814, according to information analyzed by the information file analysis unit 816 (more specifically, a state rollback method). In a case where the information transmission apparatus monitoring unit 817 detects a malfunction of the information transmission apparatus 701, the transmission rollback unit 819 returns the state of the transmission destination 703 to the state before the file is transmitted by the file transmission unit 814, according to the information analyzed by the information file analysis unit 816 (more specifically, a state rollback method).

The above-described functional configuration including the units 811, 812, 813, and 814 is implemented by temporarily storing in a RAM a program, which is stored in an HDD in advance, and by executing the program by a CPU. The HDD, the RAM, and the CPU can be mounted in the information transmission apparatus 701. The HDD, in which the program is preliminarily stored, can be provided outside the information transmission apparatus 701. The program can be supplied to the information transmission apparatus 701 via a communication line of, e.g., the Internet.

The above-described functional configuration including the units 815, 816, 817, 818 and 819 is implemented by temporarily storing in a RAM a program, which is stored in an HDD in advance, and by executing the program by a CPU. The HDD, the RAM, and the CPU can be mounted in the information transmission apparatus 704. The HDD, in which the program is preliminarily stored, can be provided outside the information transmission apparatus 704. The program can be supplied to the information transmission apparatus 704 via a communication line of, e.g., the Internet.

The information file acquisition unit 811, the information file transmission unit 812, and the file transmission unit 814 are connected to a network via a network interface (not illustrated). The management server 702, the transmission destination 703, and the transmission state management apparatus 704 are connected to the network. The information file reception unit 815, the information transmission apparatus monitoring unit 817, the transmission commitment unit 818, and the transmission rollback unit 819 are connected to a network via a network interface (not illustrated) The information transmission apparatus 701 and the transmission destination 703 are connected to the network.

For example, the information transmission apparatus 701 and the transmission state management apparatus 704 exist within the same local area network (LAN). The management server 702 and the transmission destination 703 exist on the Internet outside the LAN (or in another LAN).

Figure 9A:
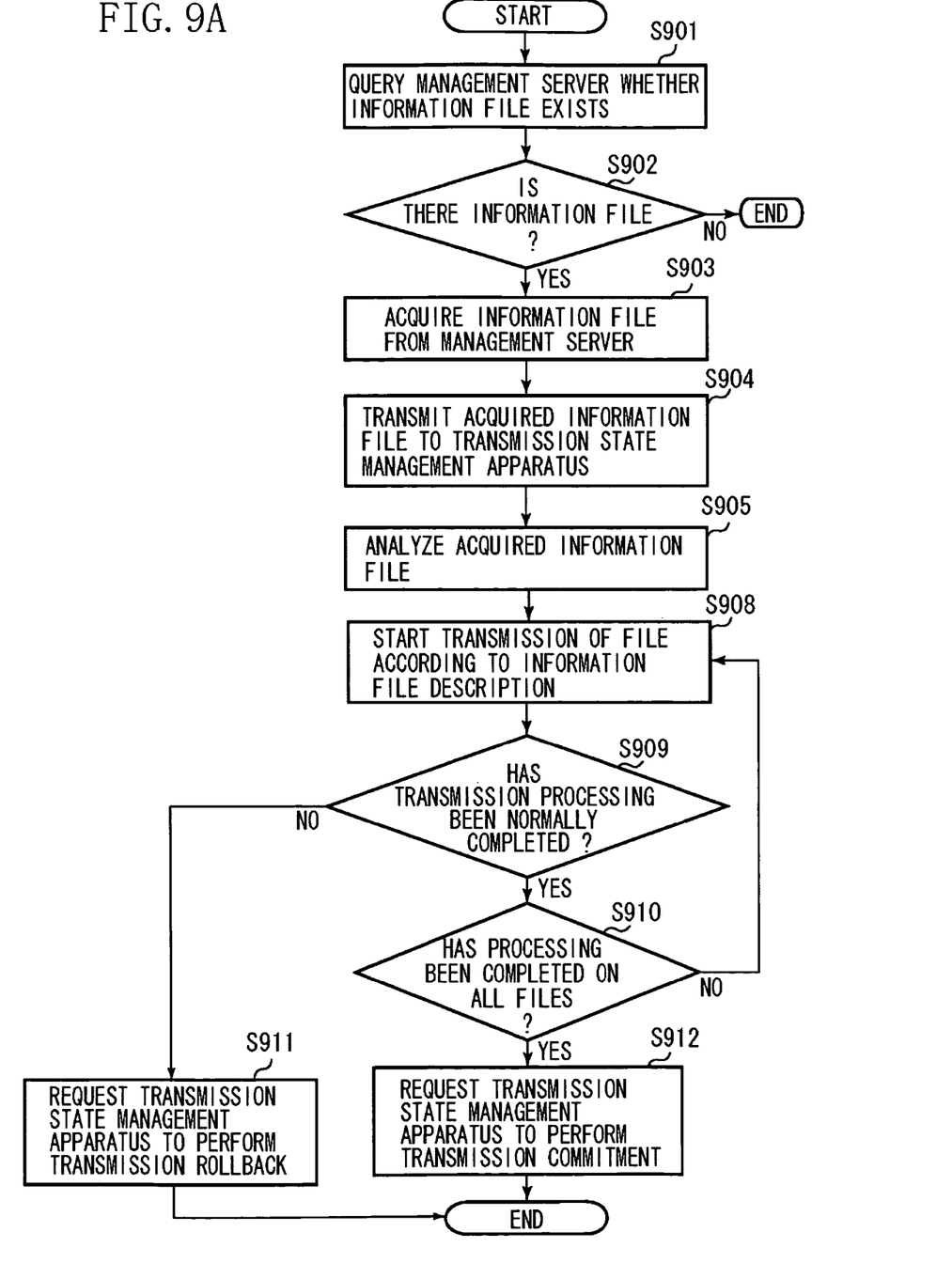
FIGS. 9A and 9B are flowcharts illustrating an operation of the information processing system according to the third exemplary embodiment of the present invention.
Figure 9B:
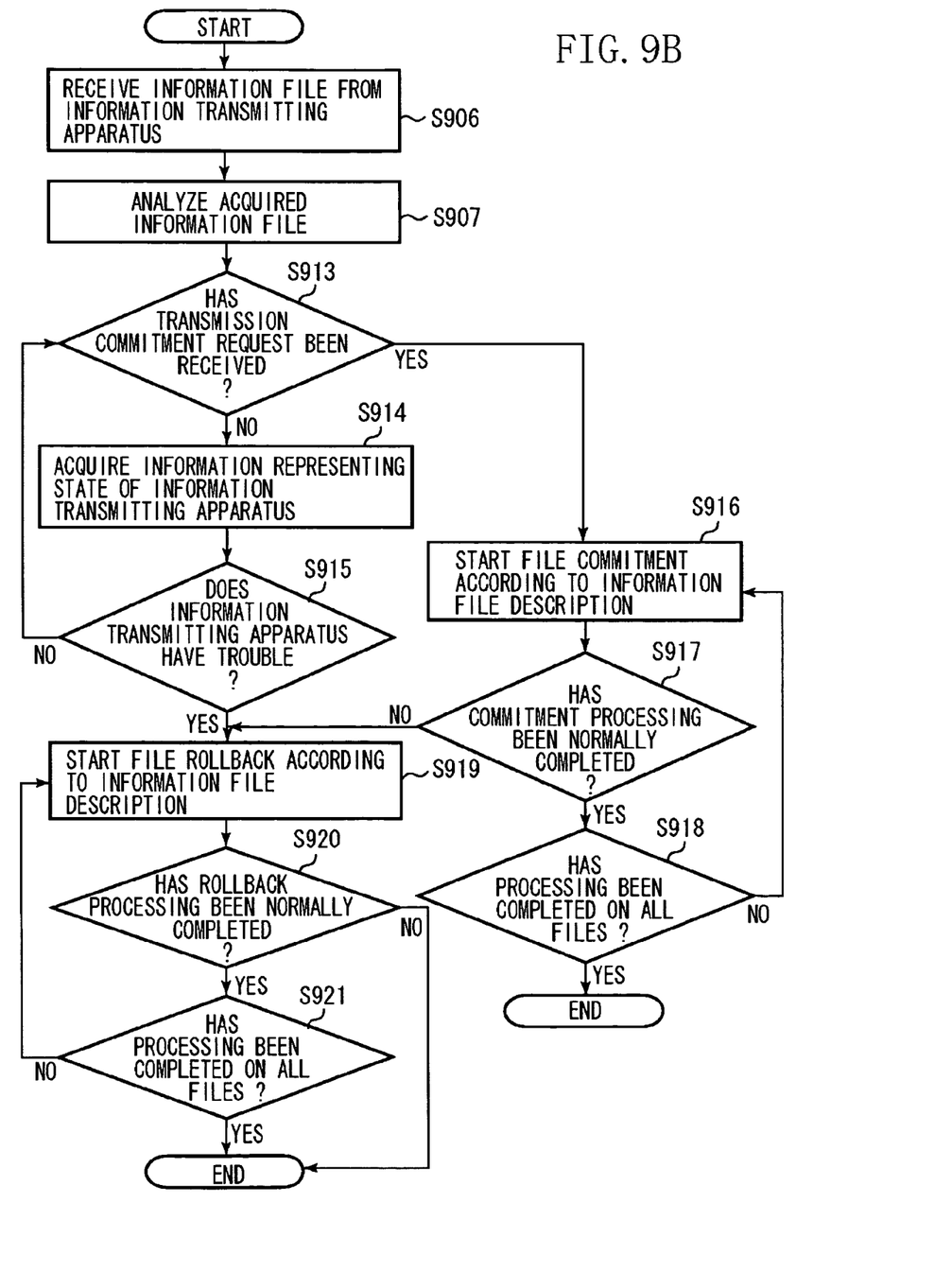

FIGS. 9A and 9B are flowcharts each illustrating a flow of an operation of the information processing system according to the present embodiment of the present invention. FIG. 9A is a flowchart illustrating an operation of the information transmission apparatus 701. FIG. 9B is a flowchart illustrating an operation of the transmission state management apparatus 704.

First, in step S901, the information file acquisition unit 811 queries whether an information file exists in the management server 702.

Then, in step S902, the information file acquisition unit 811 determines whether an information file exists in the management server 702. If an information file exists (YES in step S902), the processing proceeds to step S903. Then, in step S903, the information file acquisition unit 811 acquires the information file from the management server 702. If no information file exists (NO in step S902), the processing finishes.

Next, in step S904, the information file transmission unit 812 transmits the information file acquired by the information file acquisition unit 811 to the transmission state management apparatus 704 and transmits the information file to the information file analysis unit 813.

In step S905, the information file analysis unit 813 of the information transmission apparatus 701 analyzes the information file acquired from the information file transmission unit 812 and acquires information representing a transmission destination of each file.

In step S906, the transmission state management apparatus 704 (more specifically, the information file reception unit 815) receives an information file from the information transmission apparatus 701 (more specifically, the information file transmission unit 812).

First, the processing performed by the file transmission unit 814 subsequent to step S905, after the information file analysis unit 813 of the information transmission apparatus 701 acquires information representing a transmission destination of each file, is described below.

In step S908, the file transmission unit 814 starts transmitting a file according to the information (representing a file transmission destination and a transmitting method) described in the information file that is analyzed by the information file analysis unit 813.

Next, in step S909, the file transmission unit 814 determines whether the transmission of this file is normally completed. If the transmission of this file is normally completed (YES in step S909), the processing proceeds to step S910. Then, in step S910, the file transmission unit 814 determines whether transmission processing is completed on all target files to be transmitted.

If an error occurs in the transmission processing of this file (NO in step S909), the processing proceeds to step S911. Then, in step S911, the file transmission unit 814 of the information transmission apparatus 701 requests the transmission state management apparatus 704 to perform rollback processing on the state of the transmission destination 703.

If the transmission processing is completed on all files (YES in step S910), the processing proceeds to step S912. Then, in step S912, the file transmission unit 814 requests the transmission state management apparatus 704 to perform commitment of the transmission processing of the file. If the transmission processing is not completed on all files (NO in step S910), the file transmission unit 814 returns the processing to step S908. Then, the file transmission unit 814 starts transmitting the next target file.

Next, the processing for analyzing the contents of an information file, which is performed subsequent to step S906 by the information file analysis unit 816 of the transmission state management apparatus 704, is described below.

In step S907, the information file analysis unit 816 analyzes the contents of the information file. Then, in step S913, the information transmission apparatus monitoring unit 817 determines whether this unit is requested by the information transmission apparatus 701 to perform commitment of the transmission of a file. Incidentally, in step S912, the information transmission apparatus 701 requests commitment of the transmission processing.

If the commitment of the transmission of the file is requested (YES in step S913), the processing proceeds to step S916. Then, in step S916, the transmission commitment unit 818 starts the commitment of the transmission of the file to the transmission destination 703 according to the contents (more specifically, the transmission commitment method) described in the information file analyzed in step S907, which is described below.

Next, in step S917, the transmission commitment unit 818 determines whether the commitment of the transmission processing of this file is normally completed. If the commitment processing of the transmission of this file is normally completed (YES in step S917), the processing proceeds to step S918. Then, in step S918, the transmission commitment unit 818 determines whether the processing is completed on all target files. If the processing is completed on all target files (YES in step S918), the processing finishes.

If the commitment processing of the transmission of this file is not normally completed (NO in step S917), the processing returns to step S916. Then, the transmission commitment unit 818 starts commitment of transmission processing of the next target file.

If it is determined in step S917 that the commitment of the transmission processing of this file is not normally completed (NO in step S917), the processing proceeds to step S919. If it is determined that the rollback processing on the state of the transmission destination 703 is requested by the information transmission apparatus 701 (YES in step S915), the processing proceeds to step S919 from step S915. In step S911, the information transmission apparatus 701 requests rollback processing.

If the commitment of the transmission of the file is not requested (NO in step S913), the processing proceeds to step S914. Then, in step S914, the information transmission apparatus monitoring unit 817 acquires information representing a current state of the information transmission apparatus 701 from the information transmission apparatus 701.

Next, in step S915, based on the acquired information, the information transmission apparatus monitoring unit 817 determines whether there are any errors with the information transmission apparatus 701, and thereby transmission of a file cannot occur.

If it is determined that there are any errors with the information transmission apparatus 701 (YES in step S915), the processing proceeds to step S919. In a case where no error is detected in the information transmission apparatus 701, and the file transmission processing is normally continued (NO in step S915), the processing returns to step S913. Then, the processing of steps S913 through S915 is repeated.

The information transmission apparatus monitoring unit 817 can determine occurrence of an error in the information transmission apparatus 701 by monitoring a signal transmitted by the information transmission apparatus 701 to the transmission destination 703.

In step S919, the transmission rollback unit 819 starts rollback processing on the state of the transmission destination with respect to a target file to the state before the transmission of the file is started, according to the contents described in the information file (more specifically, a state rollback method) analyzed in step S907.

Next, in step S920, the transmission rollback unit 819 determines whether the rollback processing on the state of the transmission destination 703 with respect to this file to the state before the start of the transmission of the file is normally completed. In a case where an error occurs in the rollback processing on the state of the transmission destination 703 (NO in step S921), the processing finishes.

In a case where the rollback processing on the state of the transmission destination 703 is normally completed (YES in step S920), the processing proceeds to step S921. Then, in step S921, the transmission rollback unit 819 determines whether the rollback processing on the state of the transmission destination 703 to the state before the start of the transmission of the file is normally completed on all target files.

If the rollback processing on the state of the transmission destination 703 is not completed on all target files (NO in step S921), the processing returns to step S919. Then, the transmission rollback unit 819 starts the rollback processing on the state of the transmission destination 703 with respect to the next target file. If the rollback processing on the state of the transmission destination 703 is completed on all target files (YES in step S921), the processing finishes.

The target files to be rollbacked in step S919 are files to have been transmitted until an error is detected in the transmission processing in step S909, when the processing proceeds to step S919 from step S915. This is the same with the case where the rollback processing on the state of the transmission destination is requested.

In a case where the processing proceeds from step S917 to step S919, all target files have already been transmitted. Thus, all of the files are target files of the rollback processing (the files A through C in FIG. 3). If there is a file that is not necessary to be rollbacked, it is not needed to perform the rollback processing on that file.

According to the present embodiment, the transmission state management apparatus 704 monitors a state of the file transmission processing performed by the information transmission apparatus 701, in addition to the request from the information transmission apparatus 701. Thus, even in a case where an error is detected while the file transmission processing is performed, the state of the destination can be rollbacked.

The present embodiment can deal with a case where there are a plurality of transmission destinations. In this case, the processing illustrated in FIGS. 9A and 9B are performed using an information file illustrated in, e.g., FIG. 6 that includes a plurality of transmission destinations.

The above-described exemplary embodiments can be implemented by executing a program stored in a computer-readable recording medium, such as a RAM or a read-only memory (ROM), of a computer system. This program and the computer-readable recording medium are included in the present invention.

The present invention can be practiced in the forms of a system, apparatus, method, program, recording medium, and the like. More specifically, the present invention can be applied to an apparatus consisting of single equipment.

The present invention includes the following cases. That is, a program of software that implements the functions of the exemplary embodiments is directly or remotely supplied to a system or apparatus. Then, the present invention is achieved by reading and executing the supplied program using a computer of that system or apparatus.

Therefore, the program code itself, which is installed in a computer in order to implement the function and the processing according to the exemplary embodiments of the present invention using the computer, implements the present invention. That is, the present invention includes the computer program itself for implementing the function and the processing according to the exemplary embodiments of the present invention. In this case, an object code, a program to be executed by an interpreter, script data to be supplied to an operating system (OS), and the like can be used as long as such elements have a function of the program.

Functions of the above-described exemplary embodiments can be implemented by executing the read program. In addition, the functions of the exemplary embodiments can also be implemented by part or all of actual processing executed by an OS or the like running on the computer based on an instruction of that program.

In addition, according to another method, a program read from a recording medium is written to a memory of an expansion board inserted into or a function expansion unit connected to a computer. Further, part or all of actual processes can be executed by a CPU or the like arranged in the function expansion board or unit based on an instruction issued by the program. Thus, the functions of the exemplary embodiments can also be implemented.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-066511 filed Mar. 14, 2008, which is hereby incorporated by reference herein in its entirety.

What is claimed is:

1. An information transmitting method for transmitting information via a communication line, comprising:
   transmitting a plurality of pieces of information to a plurality of transmission destinations;
   determining whether the transmission of the plurality of pieces of information has been normally completed;
   committing, for each of the plurality of transmission destinations, each of the plurality of pieces of information in a case where it is determined that the transmission of the plurality of pieces of information has been normally completed;

determining whether the commitment of each of the plurality of pieces of information for each of the transmission destination has been normally completed; and restoring the plurality of transmission destinations to a state prior to the transmission of the plurality of pieces of information by the transmitting in a case where it is determined that the commitment of any of the plurality of pieces of information has not been normally completed.

2. The method according to claim 1, wherein committing transmission processing of the plurality of pieces of information is performed by changing a name of the plurality of pieces of information.

3. The method according to claim 1, wherein a first commitment of transmission processing of the plurality of pieces of information and a second commitment of transmission processing of the plurality of transmission destinations are instructed based on first setting information including description about the first processing and second setting information including description about the second processing.

4. An apparatus configured to transmit data via a communication line, the apparatus comprising:

a processor including a transmission unit configured to transmit a plurality of pieces of information to a plurality of transmission destinations;

a determination unit configured to determine whether the transmission of the plurality of pieces of information has been normally completed;

a commitment unit configured to, for each of the plurality of transmission destinations, each of the plurality of pieces of information in a case where it is determined that the transmission of the plurality of pieces of information has been normally completed by the determination unit;

the determination unit configured to determine whether the commitment by the commitment unit of each of the plurality of pieces of information for each of the transmission destination has been normally completed; and a restoring unit configured to restore the plurality of transmission destinations to a state prior to the transmission of the plurality of pieces of information in a case where it is determined that the commitment of any of the plurality of pieces of information has not been normally completed by the commitment unit.

5. The apparatus according to claim 4, wherein the commitment unit commits, in response to completion of transmission of the plurality of pieces of information, a transmission destination of the plurality of pieces of information to commit transmission processing of the plurality of pieces of information by changing a name of the plurality of pieces of information.

6. A non-transitory computer-readable storage medium storing a computer program for data transmission via a communication line, the computer program comprising:

transmitting a plurality of pieces of information to a plurality of transmission destinations;

determining whether the transmission of the plurality of pieces of information has been normally completed;

committing, for each of the plurality of transmission destinations, each of the plurality of pieces of information in a case where it is determined that the transmission of the plurality of pieces of information has been normally completed;

determining whether the commitment of each of the plurality of pieces of information for each of the transmission destination has been normally completed; and restoring the plurality of transmission destinations to a state prior to the transmission of the plurality of pieces of information in a case where it is determined that the commitment of any of the plurality of pieces of information has not been normally completed.

7. An information transmitting apparatus for transmitting information via a communication line, comprising:

a processor including a transmission unit configured to transmit a plurality of pieces of information to a plurality of transmission destinations;

a first determination unit configured to determine whether transmission processing by the transmission unit of the plurality of pieces of information has been normally completed;

a commitment unit configured to commit, for each of the transmission destinations, the transmission processing of each of the plurality of pieces of information after all of the plurality of pieces of information have been completely transmitted to the plurality of transmission destinations, the transmission processing being committed for each of the plurality of pieces of information;

a second determination unit configured to determine whether commitment processing by the commitment unit of the transmission processing of the plurality of pieces of information has been normally completed; and a rollback unit configured to restore the plurality of transmission destinations to a state prior to execution of the transmission processing of the plurality of pieces of information in a case where the first determination unit determines that the transmission processing of any of the plurality of pieces of information has not been normally completed or in a case where the second determination unit determines that the commitment processing of the transmission processing of any of the plurality of pieces of information has not been normally completed.

8. A method for transmitting information via a communication line, comprising:

transmitting a plurality of pieces of information to a plurality of transmission destinations;

determining whether transmission processing of the plurality of pieces of information has been normally completed;

committing, for each of the transmission destinations, the transmission processing of each of the plurality of pieces of information after all of the plurality of pieces of information have been completely transmitted to the plurality of transmission destinations, the transmission processing being committed for each of the plurality of pieces of information;

determining whether commitment processing of the transmission processing of the plurality of pieces of information has been normally completed; and restoring the plurality of transmission destinations to a state prior to execution of the transmission processing of the plurality of pieces of information in a case where it is determined that the transmission processing of any of the plurality of pieces of information has not been normally completed or in a case where it is determined that the commitment processing of the transmission processing of any of the plurality of pieces of information has not been normally completed.

9. A non-transitory computer-readable storage medium storing a computer program for transmitting information via a communication line, the computer program comprising:

transmitting a plurality of pieces of information to a plurality of transmission destinations;

determining whether transmission processing of the plurality of pieces of information has been normally completed;

committing, for each of the transmission destinations, the transmission processing of each of the plurality of pieces of information after all of the plurality of pieces of information have been completely transmitted to the plurality of transmission destinations, the transmission processing being committed for each of the plurality of pieces of information;

determining whether commitment processing of the transmission processing of the plurality of pieces of information has been normally completed; and restoring the plurality of transmission destinations to a state prior to execution of the transmission processing of the plurality of pieces of information in a case where it is determined that the transmission processing of any of the plurality of pieces of information has not been normally completed or in a case where it is determined that the commitment processing of the transmission processing of any of the plurality of pieces of information has not been normally completed.

* * * * *